(12) United States Patent
Tannous

(10) Patent No.: US 7,702,764 B1
(45) Date of Patent: Apr. 20, 2010

(54) SYSTEM AND METHOD FOR TESTING NETWORK PROTOCOLS

(75) Inventor: Sameer Tannous, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 1069 days.

(21) Appl. No.: 10/769,581

(22) Filed: Jan. 30, 2004

(51) Int. Cl.
*G06F 15/173* (2006.01)
(52) U.S. Cl. .................. 709/223; 709/224; 703/13; 703/21
(58) Field of Classification Search .............. 709/223, 709/224, 230, 203, 249; 370/401, 469; 703/3, 703/20, 21
See application file for complete search history.

(56) References Cited

U.S. PATENT DOCUMENTS

| | | | | |
|---|---|---|---|---|
| 5,421,958 A * | 6/1995 | Fathauer et al. | ............... | 216/48 |
| 5,585,640 A * | 12/1996 | Huston et al. | ............ | 250/483.1 |
| 5,732,213 A * | 3/1998 | Gessel et al. | ................ | 709/224 |
| 5,822,520 A * | 10/1998 | Parker | ........................ | 709/230 |
| 5,848,236 A * | 12/1998 | Dearth et al. | ................. | 714/33 |
| 6,549,882 B1 * | 4/2003 | Chen et al. | .................... | 703/21 |
| 6,625,648 B1 * | 9/2003 | Schwaller et al. | ........... | 709/224 |
| 6,703,046 B2 * | 3/2004 | Fitzhugh et al. | ............. | 424/484 |
| 7,039,703 B1 * | 5/2006 | Clancy et al. | ............... | 709/225 |
| 7,278,061 B2 * | 10/2007 | Smith | .......................... | 714/43 |
| 7,303,758 B2 * | 12/2007 | Falotico et al. | ............. | 424/424 |
| 7,498,385 B2 * | 3/2009 | Swetlin et al. | ............. | 525/172 |
| 7,517,353 B2 * | 4/2009 | Weber | ........................ | 606/200 |
| 2001/0015984 A1 * | 8/2001 | Lenz et al. | .................. | 370/469 |
| 2003/0037314 A1 * | 2/2003 | Apuzzo et al. | ............. | 717/125 |
| 2004/0001443 A1 * | 1/2004 | Soon et al. | .................. | 370/244 |
| 2004/0127212 A1 * | 7/2004 | Wang | ......................... | 455/423 |
| 2006/0088476 A1 * | 4/2006 | Harder et al. | ............ | 424/9.411 |
| 2006/0177379 A1 * | 8/2006 | Asgari | ........................ | 424/9.3 |
| 2007/0100438 A1 * | 5/2007 | Civelli | ....................... | 623/1.46 |
| 2007/0264303 A1 * | 11/2007 | Atanasoska et al. | ......... | 424/423 |
| 2009/0026650 A1 * | 1/2009 | Dave | .......................... | 264/129 |
| 2009/0076508 A1 * | 3/2009 | Weinans et al. | ............... | 606/62 |
| 2009/0082855 A1 * | 3/2009 | Borges et al. | .............. | 623/1.42 |
| 2009/0104246 A1 * | 4/2009 | Falotico | ..................... | 424/423 |
| 2009/0111787 A1 * | 4/2009 | Lim et al. | ................... | 514/178 |
| 2009/0123515 A1 * | 5/2009 | Taylor et al. | ................ | 424/423 |

* cited by examiner

*Primary Examiner*—Lashonda T Jacobs
(74) *Attorney, Agent, or Firm*—Cesari and McKenna, LLP

(57) ABSTRACT

A system that tests a network protocol. This test system allows a user to modify a protocol in the protocol stack of the network while the test is being performed. The system receives a command to modify the protocol. The system then determines the protocol to modify and performs the modification.

30 Claims, 6 Drawing Sheets

SYSTEM AND METHOD FOR TESTING NETWORK PROTOCOLS

FIELD OF THE INVENTION

This invention relates to the testing of network protocols. More particularly, this invention relates to modifying protocols in a protocol stack during the testing of the network protocol. Still more particularly, this invention relates to receiving command in interpreted code and modifying a protocol in the protocol stack in response to the command.

PRIOR ART

Network protocols are used by processing device to communicate over a network connecting the processing devices. For purposes of this discussion, a processing device is a router, computer or other device having a processing system for processing digital data. A network protocol is made of a protocol stack. A protocol stack is a group of separate software modules or protocols that interact to transmit data between processing devices over the network. Each software module operates in a certain manner defined by a state machine. Each software module also sends a message between the machines to transfer data.

New network protocols are constantly being developed having new protocols stack and older network protocols are constantly being modified by changing the protocols in the protocol stack of the network protocol. When a new protocol is developed or an existing protocol is modified, developers desire to test the new protocol or improvements. Typically, the developers are testing protocol compliance, correctness, scalability and performance of the protocol stacks in the new network protocols or in improved existing network protocols.

It is a problem for designers of network protocols to develop systems for testing the network protocols. In order to test the network protocols, designers typically must program a unique test for each network protocol. Whenever a protocol in the network protocol is modified, the test must also be modified to test the modified protocol. To solve this problem, designers have attempted to describe the protocols through template. The templates allow decoding of a network protocol with a router executing a Pagent image of the network protocol. However, attempts to use templates have heretofore been unsuccessful.

Some test tools have been created to test network protocols that allow a designer to replay messages from a recorded file or allow a designer to create and send new messages. However, these test tools require a designer have extensive knowledge of the source code for the network protocol. Furthermore, these test tools also usually limit a designer to modifying only one protocol in the protocol stack. Another problem is that these test tools may require that the code be compiled again in order to create new messages. Thus, a test must be started over when a modification begins.

For these reasons, there is a need in the art for a test tool that provides a better system for modifying messages in protocols in a protocol stack of a network protocol during testing.

SUMMARY OF THE INVENTION

The above and other problems with the prior art are solved and an advance in the art is made by the system for testing a network protocol in accordance with this invention. A first advantage of a system in accordance with an embodiment of this invention is that messages may be added, modified, and/or deleted from any protocol in a protocol stack of a network protocol. A second advantage of a test system in accordance with an embodiment of this invention is that changes may be made to a state machine of any protocol in a protocol stack of the network protocol. A third advantage an embodiment of a test system in accordance with this invention is that the modification can be made to a protocol in the protocol stack at run time without the need to re-compile and restart testing. The testing begins by executing communications between a plurality of devices using the network protocol being tested. A command to modify one of the protocols in a protocol stack of the network protocol is received. The modification indicated in the command is then performed on the protocol in the protocol stack identified in the command.

Preferably, the command is received in compiled code of the network protocol. This allows the modification to be inserted into an interpreter without compilation. Thus, the modifications may be made at run time.

In a preferred exemplary embodiment, the following processes are used to modify messages in a protocol in the protocol stack of a network protocol in the following manner. First, when a command is received, the process determines the protocol in the protocol stack that is to be modified responsive to receiving the command.

The process may then determine whether the command is adding a message to the identified protocol. The message is then added to the identified protocol.

If the process determines the command is to remove a message from identified protocol, the message is removed from the identified protocol. If the process determines that a message in the identified protocol is to be modified, the process removes the message from the identified protocol and a message including the modification is added to the identified protocol.

The process may also determine whether a command is to modify a state machine of the identified protocol. If the command is determined to be modifying the state machine of the identified protocol, the process modifies the state machine of the identified protocol as indicated by the command.

BRIEF DESCRIPTION OF THE DRAWINGS

The above described and other features and advantage of this invention are described in the following detailed description and the following drawings.

DETAILED DESCRIPTION

Figure 1:
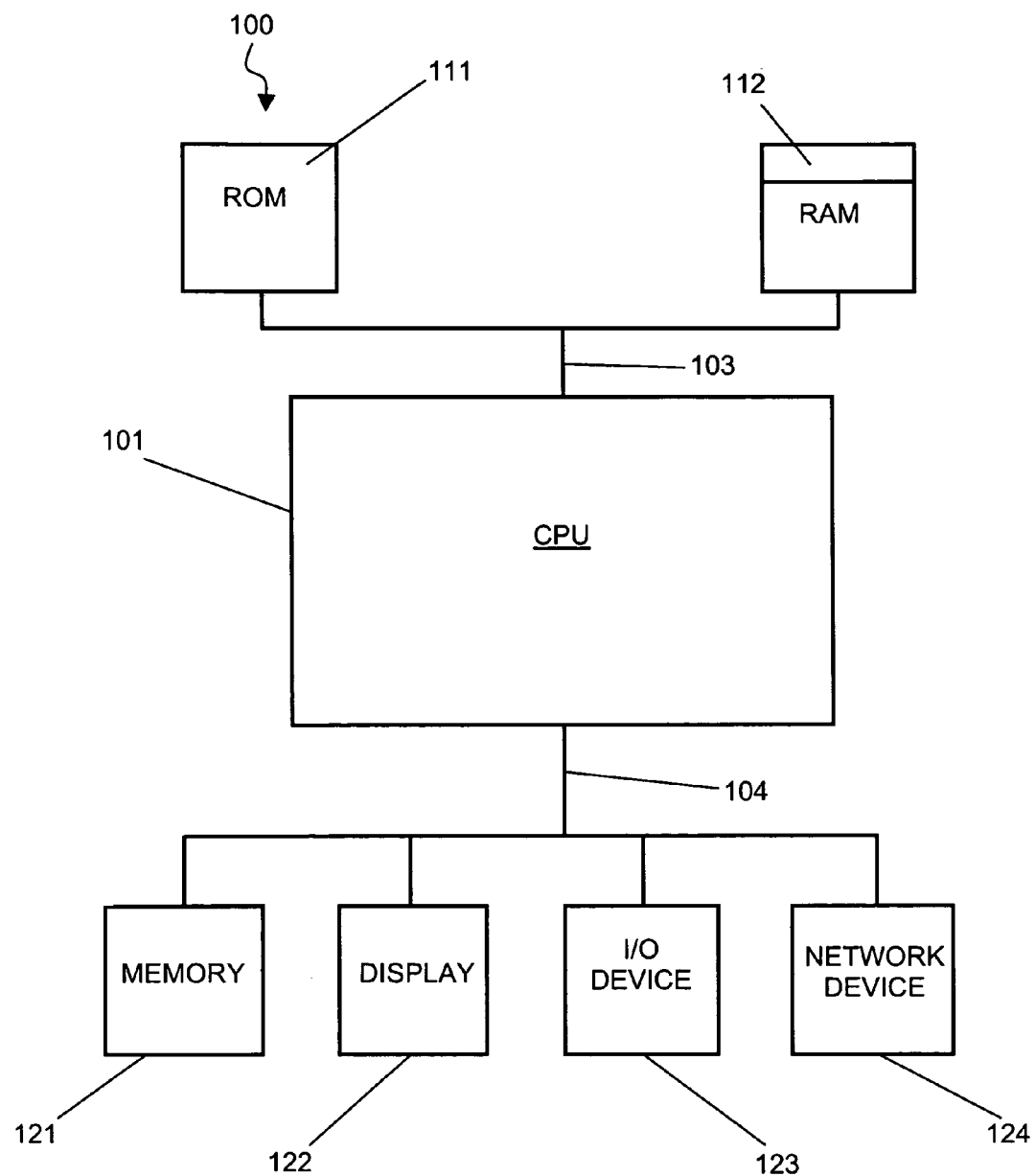
FIG. 1 illustrating a processing device that provides a testing system in accordance with this invention.

This invention relates to a system and method for providing a test system for network protocols used for communication between processing devices that allows a tester to modify a protocol in a protocol stack of the network protocol while the test is being performed. This invention is described below in a manner that allows one skilled in the art to design and use a system in accordance with this invention. When possible, like reference numerals have been used in the accompanying figures to describe the same or like elements of this invention.

FIG. 1 illustrates a processing system 100 that performs application to provide a test system in accordance with this invention. One skilled in the art will recognize that although one configuration of one processing device is shown that this invention may be implemented on more than one processing device connected over a network.

Figure 2:
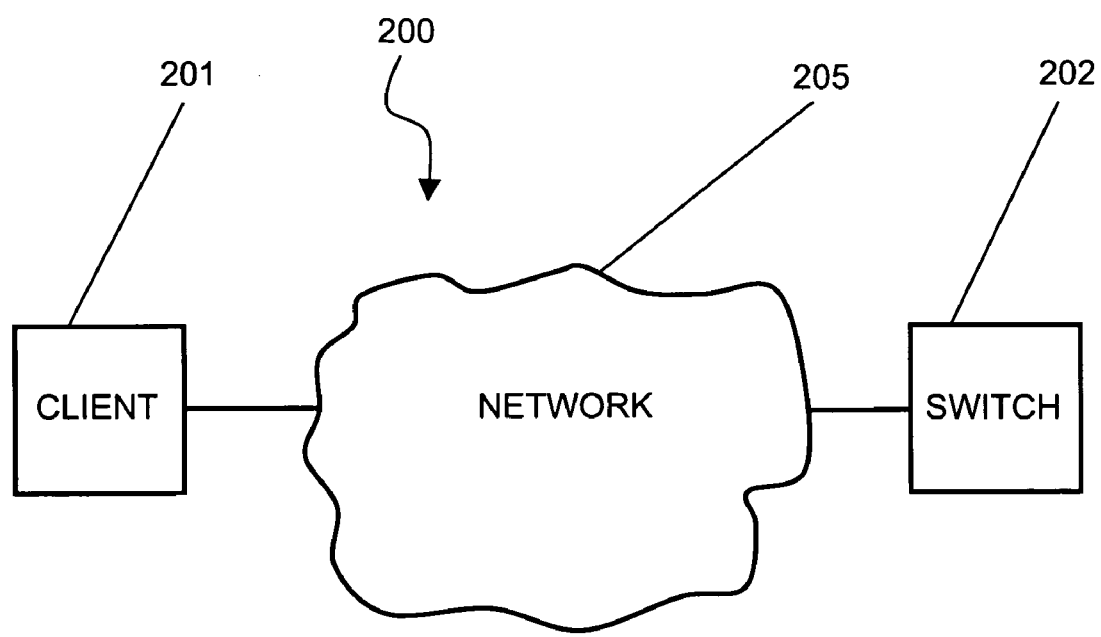
FIG. 2 illustrating a communication system being tested by a testing system in accordance with this invention.

FIG. 2 illustrates an exemplary embodiment of a communication system 200. One skilled in the art will recognize that each device connected to network 205 in FIG. 2 includes a processing system 100. However, the exact configuration and devices connected to the processing system in each individual device in the network may vary depending upon the functions that the processing device performs.

Processing system 100 has a Central Processing Unit (CPU) 101. CPU 101 is a processor, microprocessor, or any combination of processors and/or microprocessors that execute instructions stored in memory to perform an application. CPU 101 is connected to a memory bus 103 and Input/Output (I/O) bus 104.

A non-volatile memory such as Read Only Memory (ROM) 111 is connected to CPU 101 via memory bus 103. ROM 111 stores instructions for initialization and other systems command of processing system 100. One skilled in the art will recognize that any memory that cannot be written to by CPU 101 may be used for the functions of ROM 111.

A volatile memory such as Random Access Memory (RAM) 112 is also connected to CPU 101 via memory bus 204. RAM 112 stores instructions for all processes being executed and data operated upon by the executed processes. One skilled in the art will recognize that other types of memories such DRAM and SRAM may also be used as a volatile memory and that memory caches and other memory devices (not shown) may be connected to memory bus 104.

Peripheral devices including, but not limited to, memory 121, display 122, I/O device 123, and network connection device 124 that are connected to CPU 201 via I/O bus 104. I/O bus 104 carries data between the device and CPU 101. Memory 121 is a device for storing data unto a media. Some examples of memory 121 include read/write compact discs (CDs), and magnetic disk drives. Display 122 is a monitor or display and associated drivers that convert data to a display. I/O device 123 is a keyboard, a pointing device or other device that may be used by a user to input data. Network device 124 is a modem or Ethernet "card" that connects processing system 100 to a network. One skilled in the art will recognize that exact configuration and devices connected to each processing system may vary depending upon the operations of the processing system.

This invention relates to a test system for testing a network protocol. A network protocol is a system that provides communications between processing devices in a network. FIG. 2 illustrates a diagram of a system 200 in which a first processing device 201 and a second processing device 202 are connected by a network 205 to allow the processing device to transmit data to each other. Data is transmitted by the processing devices in packets. A network protocol is the messages transmitted between the processing devices to assure the delivery of packets. The network protocol is formed by a protocol stack. A protocol stack includes the various software packets transmitted between the processing system. Typically, the data from lower protocol in the stack is encapsulated by the packet of a higher protocol in the stack.

Figure 3:
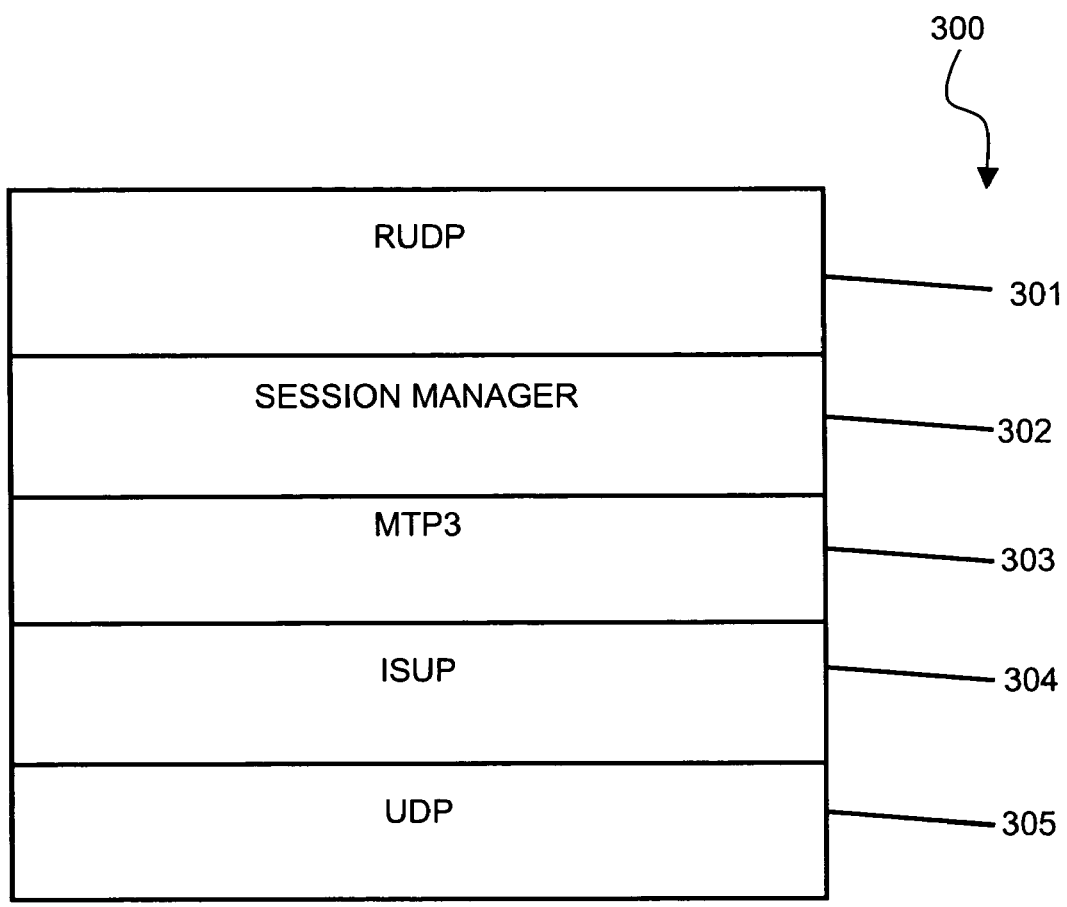
FIG. 3 illustrating a conceptual diagram of a protocol stack of software applications in a system being tested.

FIG. 3 illustrates a conceptual diagram of an exemplary protocol stack of a network protocol. The first layer of protocol stack 300 is RUDP 301. The second layer of the stack is a session manager 303. The third layer is MTP3. The fourth layer is ISUP. The fourth and lowest layer is UDP. These protocols work together to transmit packets over network.

Figure 4:
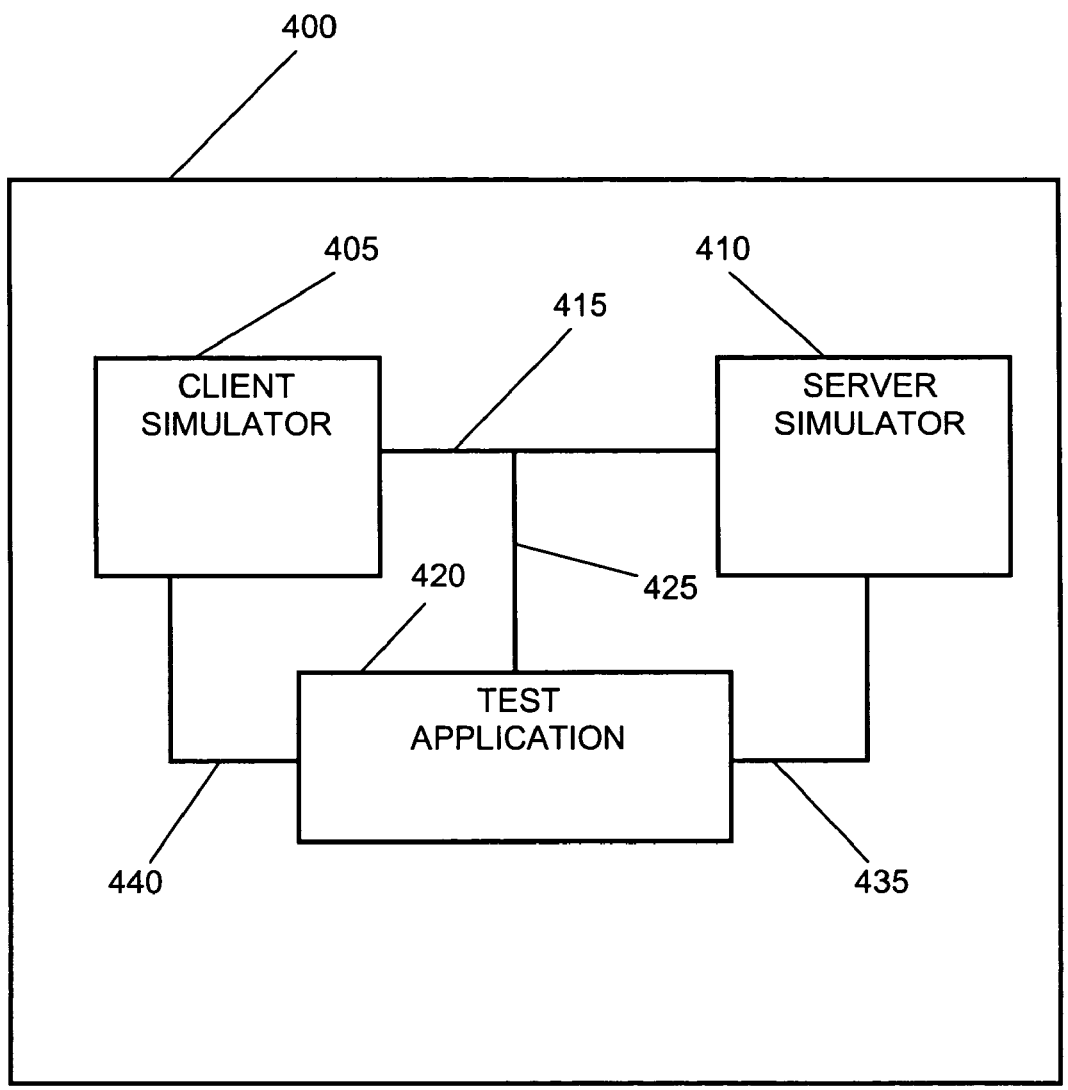
FIG. 4 illustrating a conceptual diagram of a testing system in accordance with this invention.

In order to test a network protocol, test system must emulate devices communicating over a network using the protocol. A test application is also executed which monitors the messages transmitted between the emulated devices and execution of applications in a processing device. FIG. 4 illustrates a test system 400 being executed by a processing system. One skilled in the art will recognize that test system 400 may be executed by a single processing system or multiple processing systems connected by a network. Test system 400 includes software executing emulations of first processing device 405 and a second processing device 410 transmitting packets over path 415 using the network protocol under test. Preferably, each protocol in the protocol stack is modeled by a data object. Each data object modeling a protocol is de-coupled from the objects modeling other protocol. The de-coupling allows modifications to the data structures of the data objects while the test is being performed. One skilled in the art will recognize that more than two processing devices may be emulated.

Test application 420 is also executed. Test application also receives packets transmitted over path 415 via path 425 to monitor the messages being passed between the processing devices during a communication session. Internal messages and internal data generated during the communication session in first processing device 405 are received by the test application 410 via path 430. Internal messages and internal data generated during the communication session in second processing device 410 are received by the test application 410 via path 435.

Figure 5:
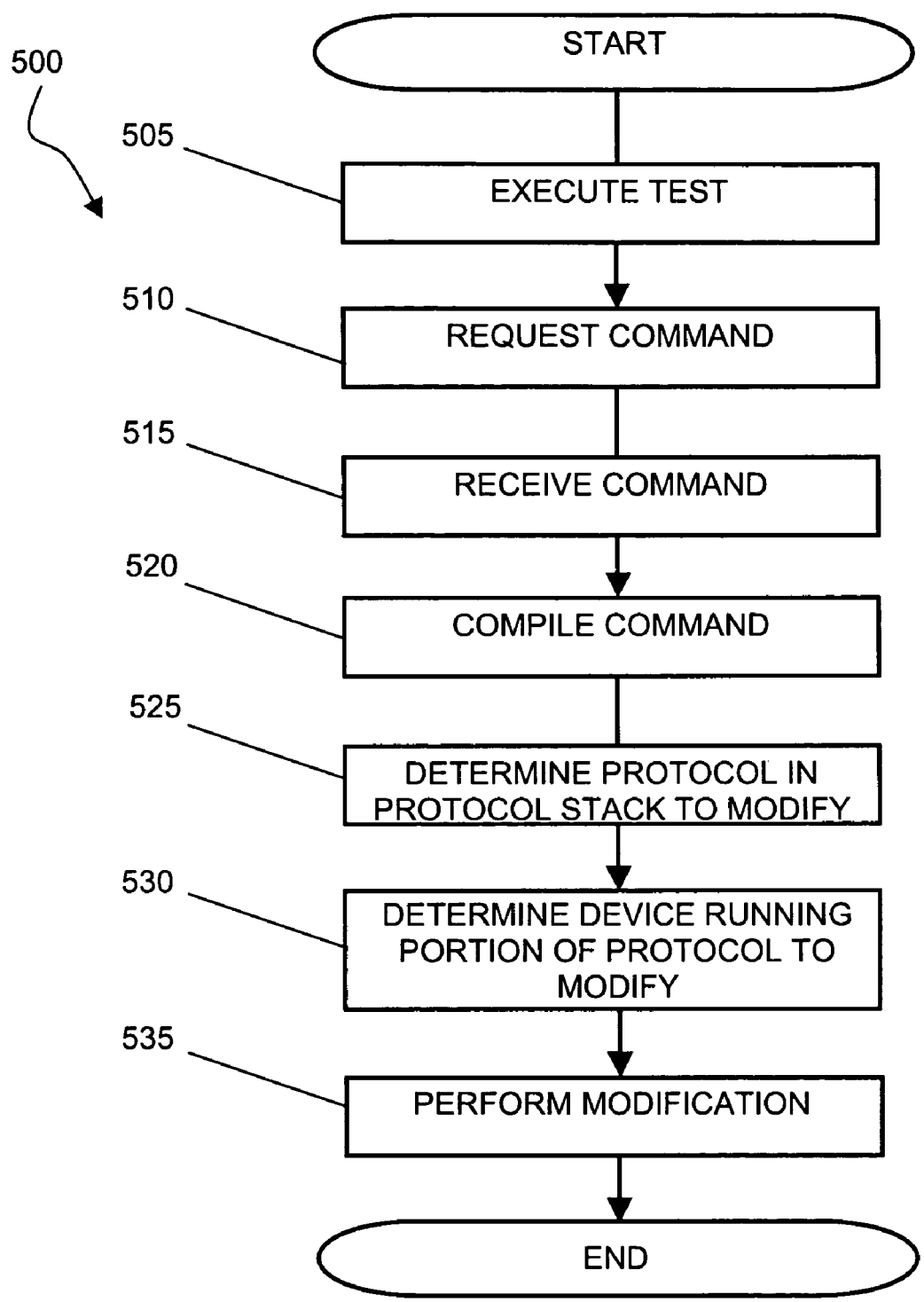
FIG. 5 illustrating a flow diagram of a process for modifying a protocol in a protocol stack of a network protocol by a test system in accordance with this invention.

This invention allows a test application to add new messages, delete messages, modify messages, and modify a state machine of any protocol in a protocol stack of a network protocol during the executing of a test of the network protocol. FIG. 5 illustrates a preferred exemplary embodiment of a test application in accordance with this invention. Process 500 begins in step 505 by executing the test. The test application and emulation of all devices are executed in a conventional manner. Preferably, the test models each protocol in the protocol stack as a separate data object. Each data object is de-coupled from the data objects modeling the other protocols. This allows the data structures of the data objects to be changed while the test is being performed.

In step 510, a display requesting a command to modify a protocol in a protocol stack in the network protocol being tested. The display may be a window, kernal, or box displayed on a user screen requesting input of a command. In step 515, a command to modify a protocol in the protocol stack received. Preferably, the command is received in interpreted code to allow direct insertion into the protocol. Also, preferably, the command includes the protocol in the protocol stack to be modified, the type of change, and possibly the device that is to receive the change to the protocol.

If the command is not in interpreted code, the command is compiled into translated code in step 520. Preferably, the compilation is completed without having to recompile the code for the entire protocol. This allows the test to continue during insertion since the entire protocol does not have to be recompiled.

In step 525, process 500 determines which protocol in the protocol stack is to be modified by the command. In step 530, process 500 determines which device running the protocol is to be modified. One skilled in the art will recognize that the command may modify the protocol in one, multiple, or all the processing devices being emulated.

In step 535, the modification is performed on the protocol in the determined protocol stack in all determined device. This may include adding a message, removing a message, modifying a message, or modifying a state machine of the protocol in protocol stack. After step 535, process 500 ends.

Figure 6:
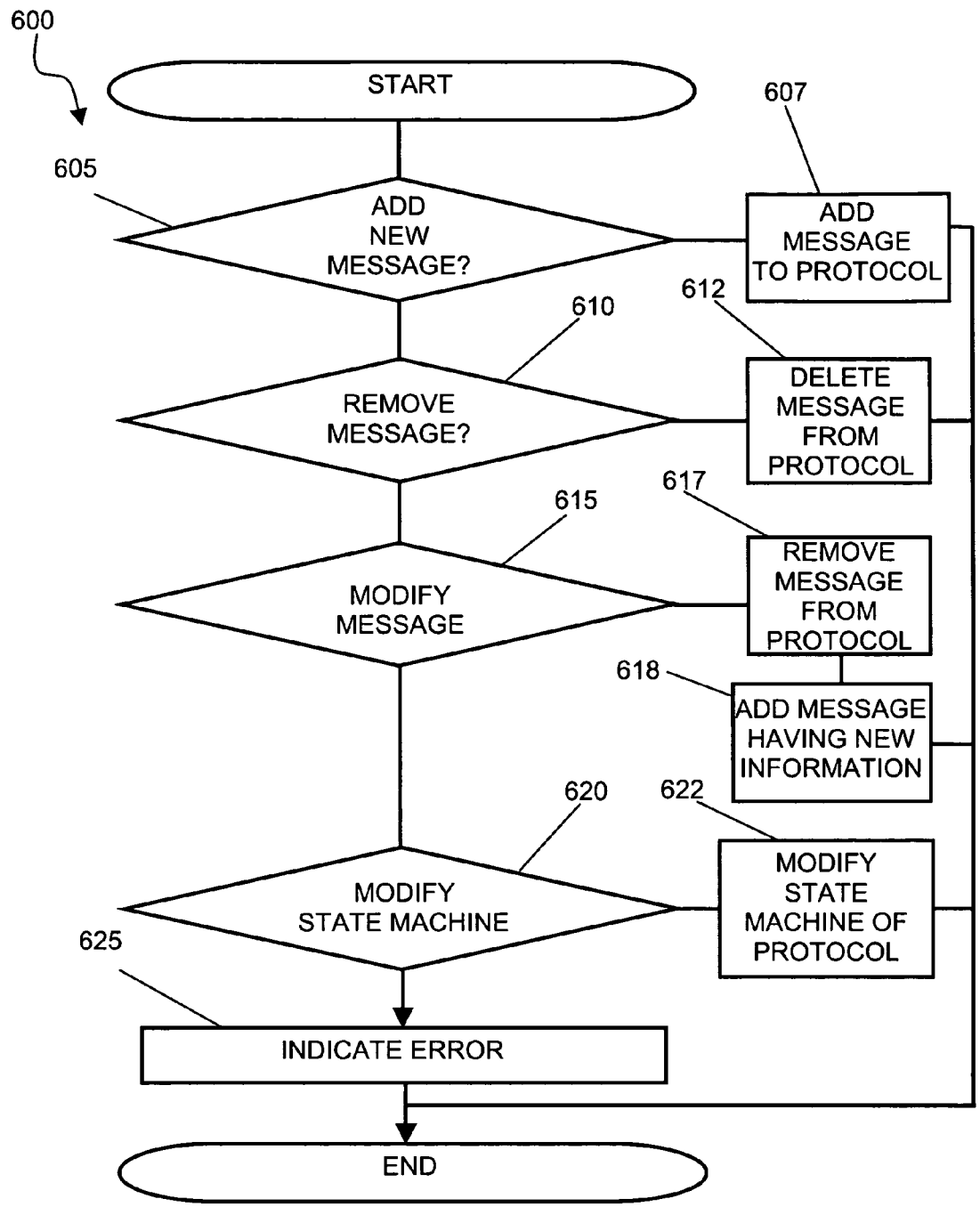
FIG. 6 illustrating a flow diagram of a process for performing modifications in accordance with this invention.

FIG. 6 illustrate process 600 for performing the step 535 of process 500. Process 600 begins in step 605 where process 600 determines whether the command is adding a new message to the protocol. If the command is adding a new message, the new message is added to the protocol in step 607 and process 600 ends.

If the command is determined not to be adding a new message, process 600 determines whether a message is being removed from the protocol by the command in step 610. If the command is removing a message, the message is removed from the protocol in step 612.

If the command is determined not to be removing a message, process 600 determines whether the command is modifying a message in step 615. If the command is removing a message, the message is removed in step 617. In step 618, a new command is generated from the old command and includes the modifications to the message and adds the message to the protocol.

If the command is not for modifying a message, process 600 determines whether the command is to modify a state machine of the protocol in step 620. If the command is to modify the state machine, the state machine is modified in step 622. The modification may include adding a new state, removing a state, modifying a state, or changing the jumps from one state to another state. If the command is not to modify the state machine, process 600 returns an error in step 630 and process 600 ends.

The above is a description of exemplary embodiments of this invention. Those skilled in the art can and will design alternative embodiments that can and will design alternative embodiments that infringe this invention as set forth in the following claims either literally or through the Doctrine of Equivalents.

What is claimed is:

1. A method for modifying and testing a network protocol stack that includes a plurality of protocols, the method comprising:
   executing a test of said network protocol stack using a processing system, the test modeling each protocol of said plurality of protocols of said protocol stack as separate objects, the test simulating communication between a plurality of devices using said network protocol stack;
   receiving a command comprising code to modify one of said plurality of protocols in said protocol stack; and
   performing said modification on said one of said plurality of protocols in said protocol stack while the test is executing, by changing said separate object corresponding to said one of said plurality of protocols in said protocol stack.

2. The method of claim 1 wherein said command is received in interpreted code.

3. The method of claim 1 further comprising:
   determining said one of said plurality of protocols in said protocol stack to modify responsive to receiving said command.

4. The method of claim 1 further comprising:
   determining whether said command is adding a message to said one of said plurality of protocols; and
   adding said message to said one of said plurality of protocols.

5. The method of claim 1 further comprising:
   determining whether said command is to remove a message from said one of said plurality of protocols; and
   removing said message from said protocol.

6. The method of claim 1 further comprising:
   determining whether said command is to modify an existing message in said one of said plurality of protocols;
   removing said existing message from said one of said plurality of protocols; and
   adding a new message to said one of said plurality of protocols including said existing message with modifications in said command.

7. The method of claim 1 further comprising:
   determining whether said command is to modify a state machine of said one of said plurality of protocols; and
   modifying said state machine of said one of said plurality of protocols responsive to said command.

8. An apparatus for modifying and testing a network protocol stack that includes a plurality of protocols, the apparatus comprising:
   means for executing a test of said network protocol stack, the test modeling each protocol of said plurality of protocols of said protocol stack as separate objects, the test simulating communication between a plurality of devices using said network protocol stack;
   means for receiving a command comprising code to modify one of said plurality of protocols in said protocol stack; and
   means for performing said modification on said one of said plurality of protocols in said protocol stack while the test is executing, by changing said separate object corresponding to said one of said plurality of protocols in said protocol stack.

9. The apparatus of claim 8 wherein said command is received in interpreted code.

10. The apparatus of claim 8 further comprising:
    means for determining said one of said plurality of protocols in said protocol stack to modify responsive to receiving said command.

11. The apparatus of claim 8 further comprising:
    means for determining whether said command is adding a message to said one of said plurality of protocols;
    means for adding said message to said one of said plurality of protocols.

12. The apparatus of claim 8 further comprising:
    means for determining whether said command is to remove a message from said one of said plurality of protocols; and
    means for removing said message from said protocol.

13. The apparatus of claim 8 further comprising:
    means for determining whether said command is to modify an existing message in said one of said plurality of protocols;
    means for removing said existing message from said one of said plurality of protocols; and
    means for adding a new message to said one of said plurality of protocols including said existing message with modifications in said command.

14. The apparatus of claim 8 further comprising:
    means for determining whether said command is to modify a state machine of said one of said plurality of protocols; and
    means for modifying said state machine of said one of said plurality of protocols responsive to said command.

15. A computer readable medium carrying one or more instructions for modifying and testing a network protocol stack that includes a plurality of protocols, the one or more instructions including instructions which executed by one or more processors, cause the one or more processors to perform:

executing a test of said network protocol stack, the test modeling each protocol of said plurality of protocols of said protocol stack as separate objects, the test simulating communication between a plurality of devices using said network protocol stack;

receiving a command comprising code to modify one of said plurality of protocols in said protocol stack; and performing said modification on said one of said plurality of protocols in said protocol stack while the test is executing, by changing said separate object corresponding to said one of said plurality of protocols in said protocol stack.

16. The medium of claim 15 wherein said command is received in interpreted code.

17. The medium of claim 15 wherein said one or more instructions further include instructions which executed by one or more processors, cause the one or more processors to perform:

determining said one of said plurality of protocols in said protocol stack to modify responsive to receiving said command.

18. The medium of claim 15 wherein said one or more instructions further include instructions which executed by one or more processors, cause the one or more processors to perform:

determining whether said command is adding a message to said one of said plurality of protocols; and adding said message to said one of said plurality of protocols.

19. The medium of claim 15 wherein said one or more instructions further include instructions which executed by one or more processors, cause the one or more processors to perform:

determining whether said command is to remove a message from said one of said plurality of protocols; and removing said message from said protocol.

20. The medium of claim 15 wherein said one or more instructions further include instructions which executed by one or more processors, cause the one or more processors to perform:

determining whether said command is to modify an existing message in said one of said plurality of protocols;

removing said existing message from said one of said plurality of protocols; and adding a new message to said one of said plurality of protocols including said existing message with modifications in said command.

21. The medium of claim 15 wherein said one or more instructions further include instructions which executed by one or more processors, cause the one or more processors to perform:

determining whether said command is to modify a state machine of said one of said plurality of protocols; and modifying said state machine of said one of said plurality of protocols responsive to said command.

22. An apparatus for modifying and testing a network protocol stack that includes a plurality of protocols, the apparatus comprising:

a memory configured to store instructions;

a network connection device configured to provide connectivity to a network;

a central processing unit configured to execute instructions stored in the memory to initiate a test of said network protocol stack, the test simulating communication between a plurality of devices using said network protocol stack, by emulating at least some of the plurality of devices;

an input/output (I/O) device configured to receive a command to modify one of said plurality of protocols in said protocol stack; and a central processing unit further configured to perform said modification on said one of said plurality of protocols in said protocol stack while the test is executing by changing a data structure corresponding to said one of said plurality of protocols in said protocol stack.

23. The apparatus of claim 22 wherein said command is received in interpreted code.

24. The apparatus of claim 22 further comprising:

the central processing unit further configured to determine said one of said plurality of protocols in said stack to modify responsive to receiving said command.

25. The apparatus of claim 22 further comprising:

the central processing unit further configured to determine whether said command is adding a message to said one of said plurality of protocols; and the central processing unit further configured to add said message to said one of said plurality of protocols.

26. The apparatus of claim 22 further comprising:

the central processing unit further configured to determine whether said command is to remove a message from said one of said plurality of protocols; and the central processing unit further configured to remove said message from said protocol.

27. The apparatus of claim 22 further comprising:

the central processing unit further configured to determine whether said command is to modify an existing message in said one of said plurality of protocols;

the central processing unit further configured to remove said existing message from said one of said plurality of protocols; and the central processing unit further configured to add a new message to said one of said plurality of protocols including said existing message with modifications in said command.

28. The apparatus of claim 22 further comprising:

the central processing unit further configured to determine whether said command is to modify a state machine of said one of said plurality of protocols; and the central processing unit further configured to modify said state machine of said one of said plurality of protocols responsive to said command.

29. The method of claim 1 wherein said performing said modification while the test is executing performs the test absent recompilation of said network protocol stack or restart of the test.

30. The apparatus of claim 22 wherein the central processing unit is configured to perform said modification while the test is executing absent recompilation of said network protocol stack or restart of the test.

\* \* \* \* \*